(12) United States Patent
Schuttenberg

(10) Patent No.: US 11,301,252 B2
(45) Date of Patent: Apr. 12, 2022

(54) EXECUTING MUTUALLY EXCLUSIVE VECTOR INSTRUCTIONS ACCORDING TO A VECTOR PREDICATE INSTRUCTION

(71) Applicant: Arm Limited, Cambridge (GB)

(72) Inventor: Kim Richard Schuttenberg, Gilbert, AZ (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/743,484

(22) Filed: Jan. 15, 2020

(65) Prior Publication Data

US 2021/0216317 A1 Jul. 15, 2021

(51) Int. Cl.
*G06F 9/38* (2018.01)
*G06F 9/30* (2018.01)

(52) U.S. Cl.
CPC ........ *G06F 9/3836* (2013.01); *G06F 9/30018* (2013.01); *G06F 9/30036* (2013.01); *G06F 9/3838* (2013.01); *G06F 9/3887* (2013.01)

(58) Field of Classification Search
CPC ............. G06F 9/30018; G06F 9/30072; G06F 9/30036; G06F 9/3838; G06F 9/3836; G06F 9/3887; G06F 9/52
See application file for complete search history.

(56) References Cited

U.S. PATENT DOCUMENTS

| | | | | |
|---|---|---|---|---|
| 6,360,316 | B1* | 3/2002 | Baraz ................. | G06F 9/30072 712/214 |
| 2008/0034356 | A1* | 2/2008 | Gschwind ............... | G06F 8/445 717/149 |
| 2008/0270749 | A1* | 10/2008 | Ozer ..................... | G06F 9/3838 712/23 |
| 2011/0231634 | A1* | 9/2011 | Fishel ................. | G06F 9/30072 712/215 |
| 2014/0019728 | A1* | 1/2014 | Reid ..................... | G06F 9/4451 712/222 |
| 2014/0164737 | A1* | 6/2014 | Collange ............. | G06F 9/30058 712/205 |
| 2016/0062769 | A1* | 3/2016 | Park .................... | G06F 9/30058 712/235 |

FOREIGN PATENT DOCUMENTS

WO WO-2017163024 A1 * 9/2017 ........... G06F 9/3016

OTHER PUBLICATIONS

Robert Bedichek, "Some Efficient Architecture Simulation Techniques", Proceedings of the Winter 1990 USENIX Conference, Jan. 22-26, 1990, 12 pages.

* cited by examiner

*Primary Examiner* — Courtney P Carmichael-Moody
(74) *Attorney, Agent, or Firm* — Nixon & Vanderhye P.C.

(57) ABSTRACT

A data processing apparatus is provided comprising: a plurality of input lanes and a plurality of corresponding output lanes. Processing circuitry executes a first vector instruction and a second vector instruction. The first vector instruction specifies a target of output data from the corresponding output lanes that is specified as a source of input data to the input lanes by the second vector instruction. Mask circuitry stores a first mask that defines a first set of the output lanes that are valid for the first vector instruction, and stores a second mask that defines a second set of the output lanes that are valid for the second vector instruction. The first set and the second set are mutually exclusive. Issue circuitry begins processing of the second vector instruction at a lane index prior to completion of the first vector instruction at the lane index.

15 Claims, 7 Drawing Sheets

```
for each n in {0....4}:
    IF (V0[n] ≥ V1[n]):
        VA(E[n])
        VC(E[n])
    else:
        VB(E[n])
```

FIG. 2A

```
VPTET GE, [V0], [V1]
VA [E]
VB [E]
VC [E]
```

FIG. 2B

EXECUTING MUTUALLY EXCLUSIVE VECTOR INSTRUCTIONS ACCORDING TO A VECTOR PREDICATE INSTRUCTION

TECHNICAL FIELD

The present disclosure relates to data processing. More particularly, it relates to executing vector instructions.

DESCRIPTION

In a data processing apparatus, SIMD is a technique that can be used for execution of vector instructions. In particular, a single instruction is executed on a plurality of data values at the same time. In this way, it is possible to perform data processing on a large number of values quickly.

SUMMARY

Viewed from a first example configuration, there is provided a data processing apparatus comprising: a plurality of input lanes and a plurality of corresponding output lanes; processing circuitry to execute a first vector instruction and a second vector instruction, wherein the first vector instruction specifies a target of output data from the corresponding output lanes that is specified as a source of input data to the input lanes by the second vector instruction; mask circuitry to store a first mask that defines a first set of the output lanes that are valid for the first vector instruction, and to store a second mask that defines a second set of the output lanes that are valid for the second vector instruction, wherein the first set and the second set are mutually exclusive; and issue circuitry to begin processing of the second vector instruction at a lane index prior to completion of the first vector instruction at the lane index.

Viewed from a second example configuration, there is provided a method of data processing comprising: executing a first vector instruction and a second vector instruction, wherein the first vector instruction specifies a target of output data from corresponding output lanes that is specified as a source of input data to input lanes by the second vector instruction; storing a first mask that defines a first set of the output lanes that are valid for the first vector instruction; storing a second mask that defines a second set of the output lanes that are valid for the second vector instruction, wherein the first set and the second set are mutually exclusive; and beginning processing of the second vector instruction at a lane index prior to completion of the first vector instruction at the lane index.

Viewed from a third example configuration, there is provided a computer program for controlling a host data processing apparatus to provide an instruction execution environment comprising: a plurality of input lane data structures and a plurality of corresponding output lane data structures; processing programming logic to execute a first vector instruction and a second vector instruction in the execution environment, wherein the first vector instruction specifies a target of output data from the corresponding output lane data structures that is specified as a source of input data to the input lane data structures by the second vector instruction; a mask data structure to store a first mask that defines a first set of the output lane data structures that are valid for the first vector instruction, and to store a second mask that defines a second set of the output lane data structures that are valid for the second vector instruction, wherein the first set and the second set are mutually exclusive; and issue programming logic to begin processing, in the execution environment, of the second vector instruction at a lane index prior to completion of the first vector instruction at the lane index.

BRIEF DESCRIPTION OF THE DRAWINGS

The present invention will be described further, by way of example only, with reference to embodiments thereof as illustrated in the accompanying drawings, in which:

FIG. 2A shows how a series of vector instructions can be executed in dependence on different outcomes of a test;

FIG. 2B shows how the example illustrated in FIG. 2A can be presented as a vector predicate instruction followed by further vector instructions;

DESCRIPTION OF EXAMPLE EMBODIMENTS

Figure 1A:
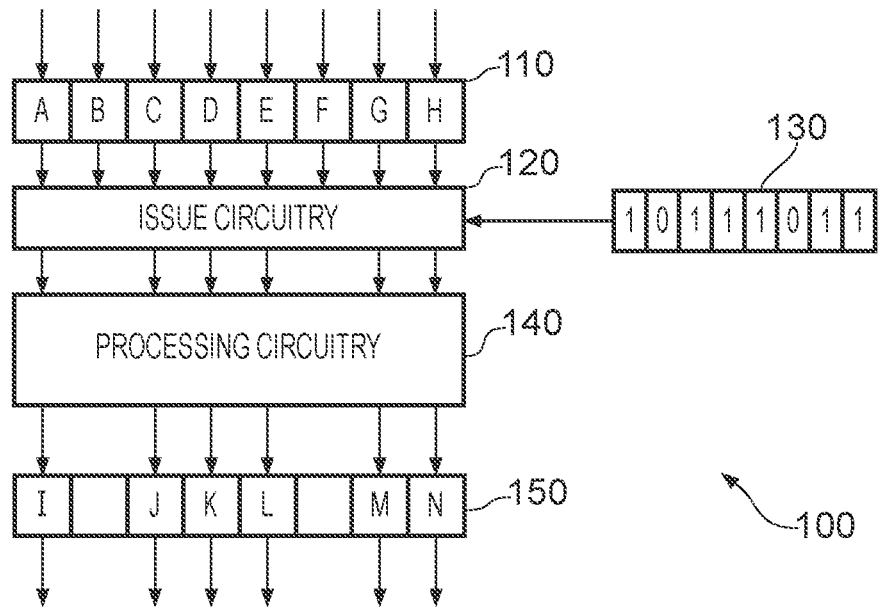
FIG. 1A schematically illustrates a data processing apparatus in accordance with some embodiments.

Before discussing the embodiments with reference to the accompanying figures, the following description of embodiments is provided.

In accordance with one example configuration there is provided a data processing apparatus comprising: a plurality of input lanes and a plurality of corresponding output lanes; processing circuitry to execute a first vector instruction and a second vector instruction, wherein the first vector instruction specifies a target of output data from the corresponding output lanes that is specified as a source of input data to the input lanes by the second vector instruction; mask circuitry to store a first mask that defines a first set of the output lanes that are valid for the first vector instruction, and to store a second mask that defines a second set of the output lanes that are valid for the second vector instruction, wherein the first set and the second set are mutually exclusive; and issue circuitry to begin processing of the second vector instruction at a lane index prior to completion of the first vector instruction at the lane index.

A vector instruction can be considered to be an instruction that is executed for a number of different data values simultaneously. One way in which this can be achieved is to provide a plurality of input lanes into which the data values are loaded. Processing circuitry then executes an instruction on the data values in the input lanes and the result of the processing each value is put into a corresponding output lane. This approach is referred to as Single Instruction Multiple Data (SIMD) processing. Within the present embodiments, mask circuitry can be used to indicate those lanes on which the processing is considered to be valid. In this way, individual lanes can be switched on or off if an instruction is not to be executed on a particular value, for instance. This makes it possible to perform different operations on subsets of the data values without having to go through the process of loading different values into the input lanes. The validity of lanes is represented by a mask. For instance, a '1' can be used to represent a lane that is valid and a '0' can be used to represent a lane that is invalid. In this way, the value '110011' could represent the fact that the first two lanes were valid, the next two lanes were invalid, and the final two lanes were valid for the next instruction to be executed. Lane validity can be handled in a number of ways. In some embodiments, the processing circuitry is inhibited from executing on invalid lanes. In other embodiments, the processing circuitry operates on the lane, but the result is not used. In the present embodiments, a first vector instruction and a second vector instruction are executed. The mask associated with each of the vector instructions (a first mask and a second mask respectively) are mutually exclusive. For instance, none of the input data values is valid in both masks (e.g. no data value is used for both instructions). In such a situation, for a given data value at a given lane index, the second vector instruction begins processing of the given data value before the first vector instruction completes on the given data value. Since the two instructions are mutually exclusive, the result of the first instruction is not necessary for the second instruction and hence processing can begin for the second vector instruction on the given data value prior to the first vector instruction completing on the given data value. The beginning of processing can include the execution itself (e.g. where the results from invalid lanes are discarded) or can include checking whether the execution is to proceed on the lane at the lane index (e.g. where execution is activated or deactivated on particular lanes). Since the second instruction need not wait for the first instruction, it is possible to improve the efficiency of the system—e.g. by eliminating false dependencies between instructions.

In some examples, the processing circuitry is responsive to a vector predicate instruction to set the first mask. A vector predicate instruction can be considered to be an instruction that indicates which of the lanes is considered to be valid for a particular instruction. Such predicate instructions can take a number of forms. In some examples, the vector predicate instruction specifies a mask value directly. In other examples, the vector predicate instruction could refer to a condition or could refer to a vector register containing values that specify which of the lanes is considered to be valid. Furthermore, the vector predicate instruction can specify the relationship between the instructions that follow the vector predicate instruction. For instance, such a relationship could indicate those instructions that are to execute in case the mask is met, or in case the mask is not met. Such instructions can be represented by a series of 'thens' which represents an instruction that is to be executed if the condition is met, and 'elses', that represent instructions that are to be executed if the condition is not met. For instance, the sequence TET represents the fact that the following instruction is to be executed where the condition is met, the instruction after that is to be executed if the condition is not met, and the instruction after that is to be executed if the condition is met. Further following instructions are not subjected to the predicate instruction and so in the absence of further predicate instructions could be executed for all input lanes.

In some examples, the data processing apparatus comprises: analysis circuitry to perform analysis of the vector predicate instruction to determine and indicate that the issue circuitry can begin processing of the second vector instruction at the lane index prior to completion of the first vector instruction at the lane index. One way in which it can be determined that the second vector instruction at the lane index begin processing prior to the completion of the first vector instruction in that lane index is to analyse the vector predicate instruction. In particular, it may not be necessary to execute vector predicate instructions in order to determine whether the masks have mutually exclusivity. In particular, there are certain circumstances in which the mutual exclusivity is known to occur or can be deduced from operations that are performed without performing calculation on the masks. This results in an increase in efficiency since it is not necessary to delay execution of the vector instructions in order to analyse the masks.

In some examples, the second mask is an inversion of the first mask, or the one of the first mask and the second mask is clear, or the second mask is produced by inverting the first mask and clearing some or all of the output lanes, or the first mask is produced by inverting the second mask and clearing some or all of the output lanes. Where the second mask is produced by inverting the first mask (or vice versa) mutual exclusivity occurs by definition. Where one of the first mask and the second mask is clear such that the first vector instruction or second vector instruction is not executed on any of the input lanes (e.g. where the mask is clear), there is also mutual exclusivity since one of the instructions is not executed at all. A further situation in which mutual exclusivity can be deduced is when the first or second mask is inverted, and lanes are cleared from that mask. In particular, since an inversion would produce mutual exclusivity, the same is true of a situation in which inversion occurs and fewer of the input lanes are applied to the first vector instruction or the second vector instruction than would occur with inversion. In these situations, a comparison between the two masks is not necessitated and so that predicate instruction need not execute prior to the first instruction or the second instruction being scheduled. For instance, one situation in which the second mask may be an inversion of the first mask is in the situation where the vector predicate instruction contains aboth 'then' and an 'else'. In such a situation, one of the first instruction and second instruction is executed if a condition is met and the other instruction is executed where the condition is not met. The masks that are used to indicate which of these two instructions is executed are therefore inversions and so also mutually exclusive. This can be determined without analysing the masks themselves and instead simply referring to how the masks would be generated when the predicate instruction(s) are executed.

In some examples, the analysis circuitry is adapted to perform the analysis prior to the first mask and the second mask being generated. Since the analysis of the vector predicate instruction occurs prior to the generation of the masks, the analysis that takes place occurs on the vector predicate instruction itself rather than a result of executing that instruction.

In some examples, the analysis circuitry is adapted to determine that the issue circuitry can begin processing of the second vector instruction at the lane index prior to completion of the first vector instruction at the lane index when: a predicate lane width of the lanes specified in the vector predicate instruction is a first integer multiple of a first lane width of the lanes specified in the first vector instruction, and the predicate lane width is a second integer multiple of a second lane width of the lanes specified in the second vector instruction. In some embodiments, the lane width is variable. That is to say that the input lanes and output lanes could be implemented as a single data structure and can be arbitrarily divided into different numbers of lanes. For instance, a 1024-bit data structure used to provide the input lanes could be divided into 8 lanes, each containing 128-bit data values or could be divided into 32 lanes each containing 32-bit values. In such embodiments, each of the vector instructions is able to specify a width of each lane. In this way, the vector instructions are able to execute on a large number of small values, or a small number of large values using the same hardware. The width of the lanes is specified in the instructions. In these embodiments, the predicate vector instruction also specifies a width of the lanes and in order to analyse the predicate instructions rather than analysing the masks produced by those predicate instructions, the width of the lanes specified in the predicate instructions is a multiple of the lane width used by the first vector instruction and a multiple of the lane width used by the second vector instruction. This makes it possible to understand how the masks apply to the lanes of the two vector instructions. It is not necessary for the multiple to be the same for each of the first and second vector instructions, although in some embodiments, this is the case.

In some examples, at least one of the first integer multiple and the second integer multiple is 1. In these embodiments, either or both of the first integer multiple and the second integer multiple is 1. For instance, the predicate lane width matches at least one of the lane widths specified in the first vector instruction and the lane width specified in the second vector instruction.

In some examples, the data processing apparatus comprises: vector predicate storage circuitry to store an indication that the vector predicate instruction is being applied, the predicate lane width, and an indication of where the first vector instruction and the second vector instruction are located. The vector predicate storage circuitry can be used to store information provided in a vector predicate instruction in order to determine whether the appropriate conditions are met such that processing of the second vector instruction at the lane index can begin prior to completion of the first vector instruction at that lane index. Such storage circuitry includes an indication that the vector predicate instruction is being applied. This can be activated on detection of the vector predicate instruction in the stream of instructions and can be deactivated once the instructions that are applied to the predicate have been handled. The vector predicate storage circuitry also includes the predicate lane width. As previously discussed, this indicates how the lanes are divided by the vector predicate instruction and can be used to determine whether the conditions under which processing of the second vector instruction at the lane index prior to completion of the first vector instruction at the lane index can occur. The vector predicate storage circuitry can also include an indication of where the first vector instruction and the second vector instruction are located. Such an indication could be an indication of where these instructions are located relative to each other and could indicate where these instructions are relative to the vector predicate instruction. For instance, the indication could include the sequence of 'thens' and 'elses', that thereby indicate how the following sequence of instructions including the first vector instruction and the second vector instruction are to be applied.

In some examples, the processing circuitry is responsive to a further vector predicate instruction to set the second mask; and the analysis circuitry is adapted to determine that the first mask and the second mask are mutually exclusive by comparing the first mask and the second mask after the vector predicate instruction and the further vector predicate instruction execute. As an alternative to analysing the vector predicate instruction, it is possible to execute the vector predicate instructions, analyse the masks that are generated, compare the masks with each other, and thereby determine whether mutual exclusivity occurs or not. Accordingly, in such examples, a further vector predicate instruction is provided in order to set the second mask. In practice, such examples are able to deal with a wider range of cases. In particular, the first mask and the second mask can be arbitrarily set. That is to say that mutual exclusivity could occur despite one of the masks not being generated as an inversion of the other mask and despite neither of the masks being completely clear. In these cases, mutual exclusivity between the masks could still exist, but due to the arbitrary setting of the masks, cannot be determined without analysing the masks themselves (in contrast to how the masks have been generated). Such a process can be useful where other instructions can be executed while the masks are being compared to each other.

In some examples, the analysis circuitry is adapted to determine that the issue circuitry begin processing of the second vector instruction at the lane index prior to completion of the first vector instruction at the lane index when: a predicate lane width of the lanes specified in the vector predicate instruction is a first integer multiple of a first lane width of the lanes specified in the first vector instruction, and the predicate lane width is a second integer multiple of a second lane width of the lanes specified in the second vector instruction. As above, the conditions relating to the relationship between the predicate lane width, the first lane width and the second lane width can affect the determination of whether the issue circuitry can begin processing the second vector instruction at the lane index prior to completion of the first vector instruction at the lane index. In particular, the predicate lane width is a first integer multiple of the first lane width and the predicate lane width is a second integer multiple of the second lane width. In some other examples, these checks are not required. In particular, if the masks are to be compared directly then this can be done in view of how the lanes are configured in each of the first instruction and the second instruction to ensure that mutual exclusivity between the bits of the data values exists.

In some examples, at least one of the first integer multiple and the second integer multiple is 1. At least one of the first integer multiple and the second integer multiple is 1. In other words, the predicate lane width matches at least one of the first lane width and the second lane width.

In some examples, the vector predicate instruction specifies a condition and an indication of a set of test values, and the mask is set based on those of the test values that meet the condition. The condition specified by the vector predicate instruction may be a condition or test that is applied to each of the test values. For instance, the vector predicate instruction could provide a condition 'GE' (greater than or equal) and references to a first set of values and a second set of values. This would provide a mask in which a '1' would be generated where one of the first set of values is greater than or equal to a corresponding one of the second set of values and a '0' otherwise. In another example, the instruction could refer to a single set of values and provide the condition 'NZ'. Here, a '1' would be generated for each value in the set of values where that value was not zero and a '0' would be generated otherwise. The indication of the test values could be a reference to a location at which the test values are stored. Note that the number of test values will generally correspond with the number of lanes specified by the predicate instruction. For instance, if the predicate instruction indicates that the width of the lanes is 32 bits and the input lanes contain a total of 1024 bits, then one might expect the reference to the test values to be a reference to 32 test values (32×32=1024).

In some examples, the first vector instruction and the second vector instruction follow the vector predicate instruction in a stream of instructions. The first vector instruction and the second vector instruction could therefore be instructions whose execution depends on the vector predicate instruction. The vector predicate instruction can therefore indicate the circumstances under which each of the first vector instruction and the second vector instruction executes for each of the lanes.

In some examples, the data processing apparatus comprises: dependency removal circuitry to remove one dependency of one or more dependencies between the first vector instruction and the second vector instruction, wherein the one dependency relates to the data values, wherein the issue circuitry is to issue the first vector instruction and the second vector instruction based on the one or more dependencies. There are a number of ways in which processing of the second vector instruction at a lane index can begin prior to completion of the first vector instruction at the lane index. One way in which this can be achieved is for a data dependency between the first vector instruction and the second vector instruction to be removed. In particular, the removed dependency may be a dependency of the second vector instruction on the first vector instruction and could have been initially provided based on the assumption that since both instructions operate or refer to the same data values, there must be a data dependency between those instructions. If this is the only dependency that exists between those instructions, it will be possible for processing of the second vector instruction at a lane index to begin prior to completion of the first vector instruction at that lane index.

In some examples, the data processing apparatus comprises: dependency generation circuitry to generate one or more dependencies between instructions including the first vector instruction and the second vector instruction, wherein the dependency generation circuitry is adapted to inhibit generation of a data dependency between the first vector instruction and the second vector instruction. As an alternative to removing the data dependency that has been generated, it is also possible to provide dependency generation circuitry in which such dependencies are not created in the first place. Consequently, the dependency generation circuitry generates dependencies as is normally expected. However, in a situation in which the first vector instruction and the second vector instruction each relate to input lanes that are mutually exclusive, no data dependency is generated between those two instructions.

In some examples, the data processing apparatus comprises: instruction generation circuitry to generate the instructions from one or more source instructions and to detect that the first set and the second set are mutually exclusive by analysis of either the instructions or the source instructions. The mutual exclusivity can be detected through static analysis. In particular, one or more source instructions can be used to generate a series of instructions including the first vector instruction and the second vector instruction. By analysis of either the instructions or the source instructions, it may be determined that the first set and the second set are mutually exclusive. For instance, it could be statically determined that the second mask is an inversion of the first mask or is generated by inverting the first mask and clearing some of the lanes. The conditions referred to in predicate instructions can also be statically analysed and compared to each other. Having determined that such mutual exclusivity exists, it may be possible to insert hints to the data processing apparatus that the two instructions should be treated as being mutually exclusive. The instruction generation circuitry could, for instance, take the form of a compiler such as a JIT compiler, which may compile bytecode into instructions that are suitable for execution on the data processing apparatus. The instruction generation circuitry may therefore perform a translation.

In some examples, the mask circuitry causes the processing circuitry to inhibit execution on input lanes where the corresponding output lanes are indicated as being invalid. In these examples, the mask circuitry handles the validity of lanes by preventing certain lanes from being executed. In these situations, the processing circuitry simply does not execute on lanes that are considered to be invalid.

In some examples, the mask circuitry causes outputs from the processing circuitry into the corresponding output lanes that are indicated as being invalid to be disregarded. In these examples, the mask used by the mask circuitry permits the execution on each of the lanes. However, for those lanes that are considered to be invalid, the result that is produced by the processing circuitry is disregarded. In practice, this could result in the data values in those output lanes not being written back and not being used as an input value for other instructions that are to be executed.

Particular embodiments will now be described with reference to the figures.

FIG. 1A schematically illustrates a data processing apparatus 100 for performing SIMD (Single Instruction Multiple Data) processing. The apparatus contains a number of input lanes 110 into which data values (A-H) are inserted. Issue circuitry 120 then issues at least some of these data values to processing circuitry 140 on which a single instruction is executed. The resulting output values (I-N) from executing this instruction is then passed to corresponding output lanes 150. The input values that are passed to the processing circuitry 140 by the issue circuitry 120 are controlled by a mask contained by mask circuitry 130. A '1' indicates that a lane is to be processed, while a '0' indicates that the lane is not to be processed by the processing circuitry 140. In this way, it is possible for the processing circuitry 140 to be selective about which of the data values (A-H) are processed. This process is known as vector processing and makes it possible to quickly perform a single operation on a large number of data values. For instance, if the operation performed by the processing circuitry 140 is to add 5, then the output data values (I-N) would include A+5, C+5, D+5, E+5, G+5, and H+5.

Figure 1B:
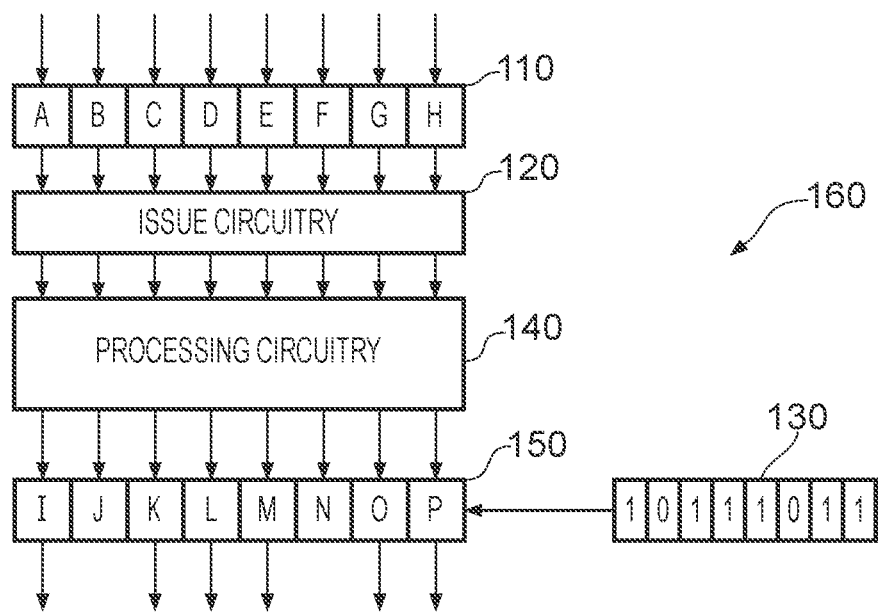
FIG. 1B schematically illustrates a data processing apparatus in accordance with some embodiments.

FIG. 1B shows a similar apparatus in which the selection of processing is controlled in a different manner. Similarly to FIG. 1A, input data values A-H are loaded into input lanes 110 and are issued by issue circuitry 120 to the processing circuitry 140. Here, the issue circuitry 120 issues each of the data values (A-H) to the processing circuitry 140. Consequently, output values (I-P) are output into the corresponding output lanes 150. At this stage, the mask in the mask circuitry 130 is used to indicate which of the output lanes are considered to be valid. In particular, the mask indicates which of the output values can be used and which are to be discarded. Again, the lanes containing output values J and N are indicated as being invalid by the mask in the mask circuitry 130 and so these outputs are discarded.

FIGS. 1A and 1B therefore indicate ways in which it is possible to select particular data values in input lanes in order to perform processing. It will be appreciated that other variants of these examples are also possible. For instance, the mask in the mask circuitry 130 could be provided directly to the processing circuitry 140, which determines which input lanes should be processed. Another variant would involve the mask in the mask circuitry 130 being used to control which data values are output by the processing circuitry 140 into the output lanes 150.

The mask in the mask circuitry 130 can be set by using predicate instructions. FIG. 2A illustrates some example code that can be executed using vector instructions and vector predicate instructions as illustrated in FIG. 2B.

In FIG. 2A, a loop is illustrates that iterates through values 0 to 4. At each iteration n, if the n'th value in array V0 is greater than the n'th value in array V1, then instruction VA is executed on element n, and instruction VC is executed on element n. Otherwise, instruction VB is executed on element n. FIG. 2B illustrates an example of how this can be implemented using vector instructions. A first vector instruction VPTET is a vector predicate instruction. This instruction specifies a condition (GE) together with two sets of test values (pointers to the arrays V0 and V1). Collectively, these provide the conditional test that a value in V0 must be greater than or equal to the corresponding value in V1. The vector predicate instruction then also specifies a location of instructions to execute depending on the outcome of the test. In particular, the instruction shown in Figure B is the sequence 'TET' corresponding with the sequence 'then, else, then'. In other words, the instruction that follows the vector predicate instruction is executed if the condition is met, the instruction following that is executed if the condition is not met, and the next following instruction is executed if the condition is met. In this case, if the condition is met, then the instructions VA and VC are executed, whereas if the condition is not met, then the instruction VB is executed. It will be appreciated that in this situation, the mask that is used to execute VA and VB will be mutually exclusive. This is because the vector predicate test is either met or it is not met. It is not possible for the condition to be both met and not met for any single value. The same is true of the mask used between instructions VB and VC. Accordingly, without analysing the mask that is actually generated for the vector predicate instruction, it is possible to determine that there is mutual exclusivity between the data values on which VA and VB are executed and that there is also mutual exclusivity on the data values on which VB and VC are executed. Accordingly, although each of instructions VA, VB, and VC execute on the same data values, there is no true dependency between these instructions.

Note that the above analysis requires the lane width used by the vector predicate instruction to be an integer multiple of the lane width used by each of the following vector instructions. If this is not the case, then it cannot be determined which of the lanes is to have the processing circuitry applied. None of the instructions illustrated in FIG. 2b specify a particular lane width and so a default lane width is applied for each instruction. In other words, the lane width of the vector predicate instruction matches a lane width of the first vector instruction and the second vector instruction (and, in this example, a third vector instruction).

Figure 3:
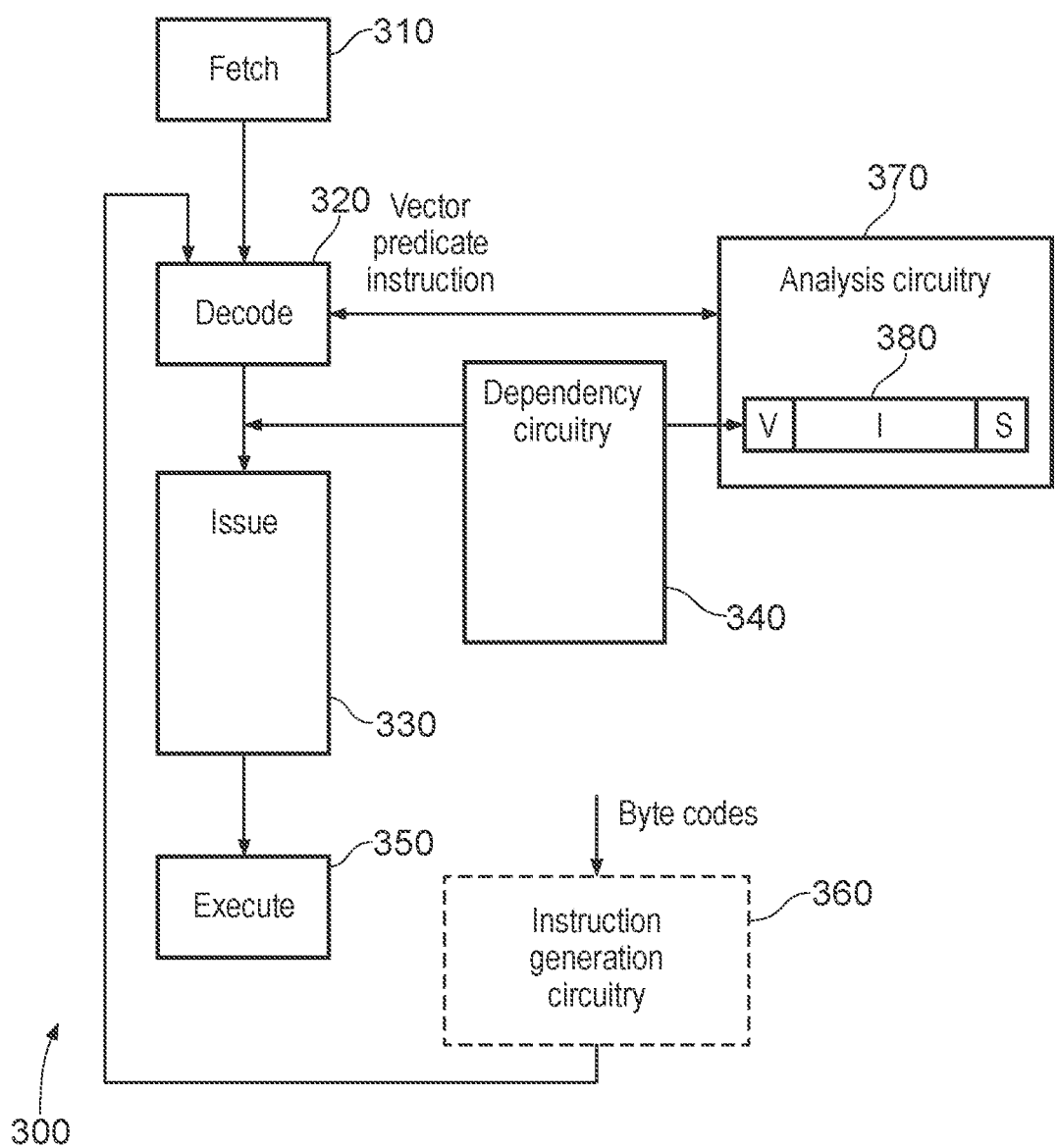
FIG. 3 illustrates an apparatus for detecting mutual exclusivity in accordance with some embodiments.

FIG. 3 illustrates an apparatus 300 for detecting mutual exclusivity and for issuing the vector instructions accordingly. A fetch unit 310 fetches instruction. The instructions could be fetched from an instruction cache and/or memory. The fetched instructions are provided to decode circuitry 320, which can communicate with analysis circuitry 370. The analysis circuitry is able to detect a vector predicate instruction, and is able to detect whether the vector predicate instruction is one where the masks that would be generated for that instruction are mutually exclusive. For example, the previously described vector predicate instruction in FIG. 2B is such that two masks are generated, which are mutually exclusive by virtue of being generated where a condition is met and where a condition is not met. Other situations in which mutual exclusivity arises also apply as illustrated with respect to FIG. 4. The analysis circuitry 370 contains a vector predicate storing register 380. This register 380 stores a number of indications including an indication that a vector predicate instruction has been detected (V), an indication of how the following series of instructions are to be applied depending on the output of the test (I), and a size of the lanes used by the vector predicate instruction (S). In the example of FIG. 2B, when the vector predicate instruction is detected, V will be set to 1, I will be set to TET, and S will be set to 1 to represent the fact that the values are treated as bytes. Once the sequence of required instructions indicated by the value I are detected via the decode circuitry 320, the register 380 can be invalidated or cleared. Having detected the presence of the vector predicate instruction, dependency circuitry 340 is used to remove the false dependency between those of the instructions that are indicated by the value I and have mutual exclusivity provided that the lane widths of those instructions match the lane width specified by the value S. In particular, taking the example of FIG. 2B, where all of the lane widths are the same, a dependency between instructions VA and VB is removed. Also, a dependency between instructions VB and VC are removed. Note that a dependency between instruction VA and instruction VC remains.

It is also possible for the dependency circuitry 340 to be such that these dependencies are not created in the first place rather than being created and removed. The instructions with the corrected dependencies are stored in issue circuitry 330. The instructions are then sent to execution circuitry 350 based on the remaining dependencies. There are other ways in which the vector predicate instruction can be detected. In particular, in some examples, instruction generation circuitry 360 is provided in order to translate instructions in one format to another format. One example of this is Just-In-Time (JIT) compilation in which one or more bytecodes are translated into instructions or microcode, which is decoded by decode circuitry 320. Here, since the instruction generation circuitry 360 (which could take the form of a compiler) may have a view of a large portion (or all) of the program, it is possible for the entire program to be analysed statically to determine situations in which the masks associated with vector predicate instructions would be mutually exclusive. At that time, hints can be inserted into the microcode, or signals can be generated and provided to the decode circuitry 320 to signal to the dependency circuitry 340 that the mutually exclusive dependencies should be erased (or not created).

Figure 4:
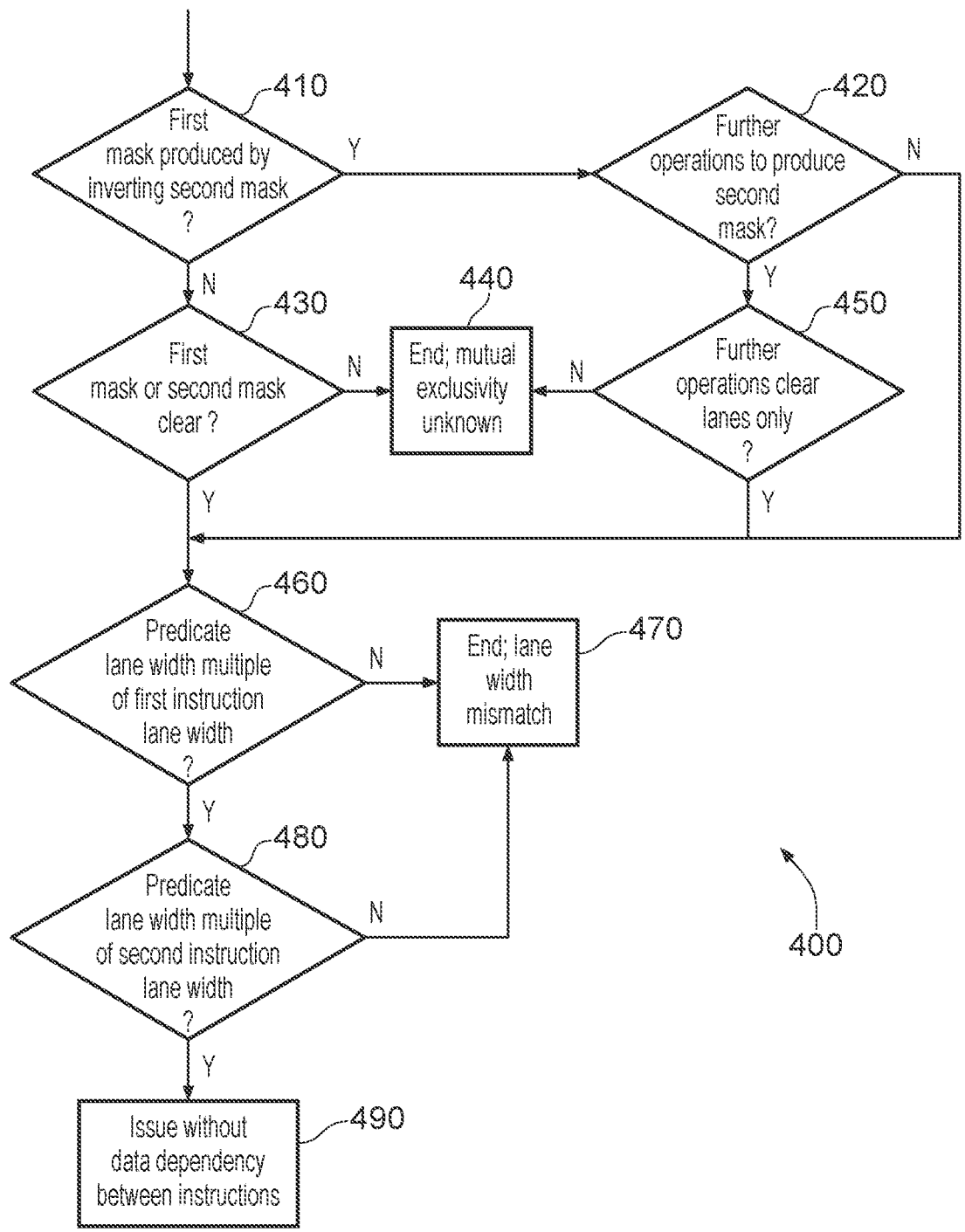
FIG. 4 shows, in the form of a flowchart, a decision making process for determining whether a predicate instruction provides mutually exclusive masks without analysis of the masks themselves, in accordance with some embodiments.

FIG. 4 illustrates a flowchart 400 that shows a decision making process that may be used by the analysis circuitry 370 to determine whether the requirements are met in order to remove the dependencies between a first vector instruction and a second vector instruction. In particular, the process considers whether the two instructions are executed in a mutually exclusive manner and whether lane width requirements are met. The process begins at a step 410, where it is determined whether a first mask that would be produced in respect of the first vector instruction is an inversion of a second mask that would be produced for a second vector instruction. Note that this process does not necessitate analysing the masks themselves and instead simply considers how the masks are produced. If the requirement is met, then at step 420, it is determined whether further operations are used in order to produce the second mask after inverting the first mask. If so, then at step 450, it is determined whether those further operations only clear (remove) lanes from the mask such that the second vector instruction is executed for fewer of the lanes. If not, then at step 440 the process ends, since the mutual exclusivity cannot be determined without analysing the masks themselves. In practice, it may be that mutual exclusivity exists. However, this cannot be determined without actually analysing the two masks after they have been generated. Otherwise, if the further operations only clear lanes, then the process proceeds to step 460. This is also the case if no further operations are used to produce the second mask in step 420. If the first mask is not produced by inversion of the second mask, then at step 430, it is determined whether either of the first mask or the second mask is clear. In other words, this question asks whether either of the first mask or the second mask results in the first vector instruction or the second vector instruction not being executed on any of the lanes. If not, then the process proceeds to step 440 where the process ends due to the mutual exclusivity being undetermined. If so, then the process proceeds to step 460.

At step 460, it has been determined, without analysing the masks themselves, that mutual exclusivity exists. Step 460 then considers the lane widths. In particular, at step 460, it is determined whether the predicate lane width is a multiple of the first instruction lane widths. If not, then the process proceeds to step 470 where the process ends due to a lane width mismatch. In particular, this step corresponds with the fact that it is not possible to easily determine which lanes the first vector instruction would be executed for based on the predicates, without further calculation. An assessment can therefore not be made and so the dependency cannot be removed. If the predicate lane width is a multiple of the first instruction lane width, then at step 480, it is determined whether the predicate lane width is a multiple of the second instruction lane width. If not, then the process returns to step 470 where the process ends due to a lane width mismatch. If there is a match, then the process proceeds to step 490 where the two instructions are issued without a data dependency between them.

Figure 5:
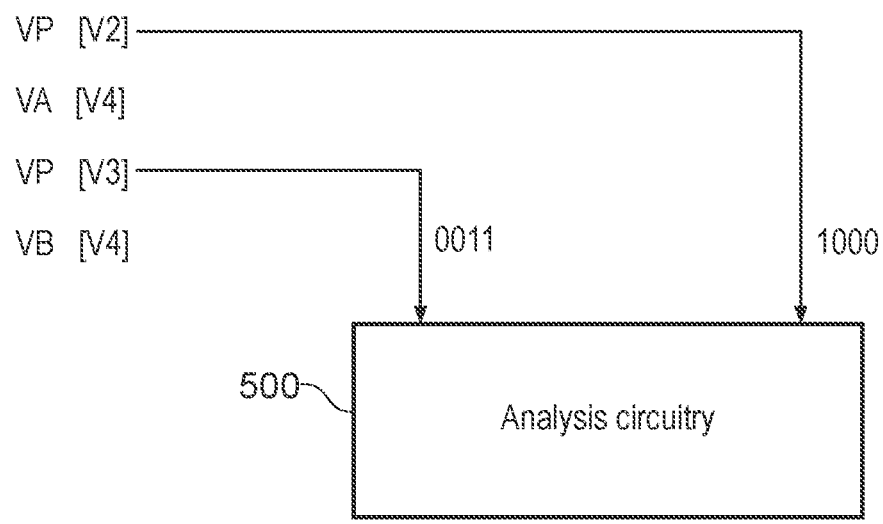
FIG. 5 illustrates further analysis circuitry for analysing the masks generated by predicate instructions in accordance with some embodiments.

FIG. 5 illustrates another form of the analysis circuitry 500. In this situation, the analysis circuitry 500 does analyse the two masks that are generated by the vector predicate instruction or instructions. This is in contrast to the previously described process where the masks themselves are not analysed, but instead the manner in which the masks are (or would be) produced is analysed to determine whether mutual exclusivity exists. In this example, a first vector prediction instruction generates the mask '1000'. A second independent vector predication instruction generates the mask '0011'. Since these two masks are, in this example, accessed from memory, there is no known relationship between the two masks and so it is not possible from analysis of the vector predicate instructions to determine that mutual exclusivity exists. Consequently, the masks themselves must be directly analysed. This can be carried out by the use of an AND boolean operation between the two masks. The result of the AND operation is then applied to a collapsing OR operation. If the result is 0, then there is no lane for which both of the instructions is executed and so mutual exclusivity exists.

This process is such that it is possible to detect a greater number of cases where no true data dependency exists between two instructions as compared to a process where the predicate instructions themselves are analysed. In this example, each of the vector predicate instructions is followed by a further instruction that utilises data values stored in a register V4. However, since none of the instructions is executed on all lanes, the two instructions are actually mutually exclusive and so do not contain a data dependency. This cannot be determined by analysis of the vector predicate instructions themselves, but instead an analysis of the generated masks is necessitated. Consequently, this form of analysis can be used in a greater number of situations. However, such analysis requires the vector instructions to be delayed until such time as the masks can be compared and the mutual exclusivity can be ascertained.

Figure 6:
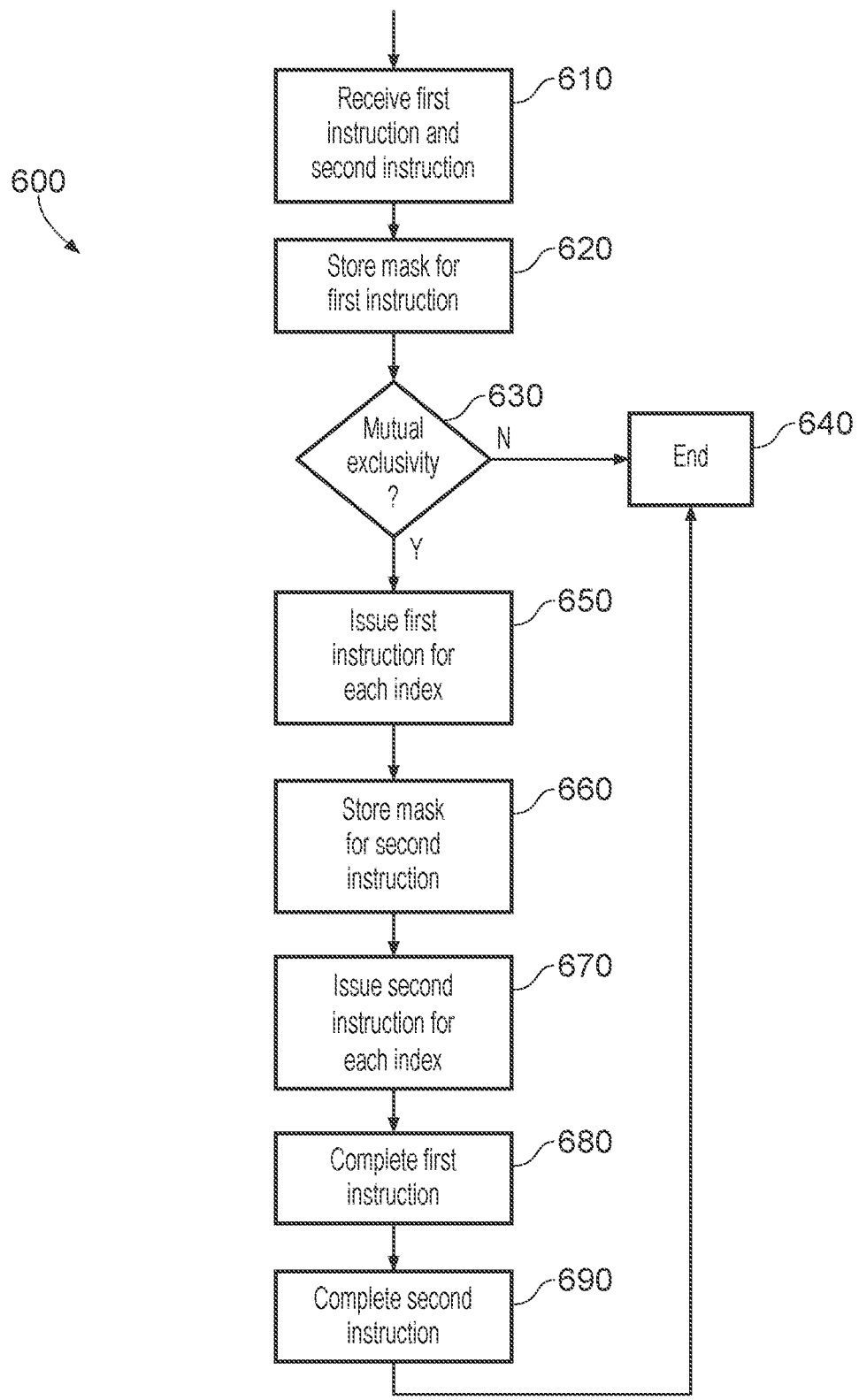
FIG. 6 illustrates a data processing method in accordance with some embodiments.

FIG. 6 illustrates a flow chart 600 that shows a process for data processing. The process begins at a step 610, where a first instruction and a second instruction are received. At a step 620, a mask for the first instruction is stored. At a step 630, it is determined whether mutual exclusivity exists. This can be achieved by analysis of the masks that are generated for the first instruction and the second instruction or can be determined based on analysis of the vector predicate instructions that predate the instructions. If there is not mutual exclusivity, then the process proceeds to step 640 where the process ends. In this situation, the first instruction and the second instruction are executed with their data dependency intact. Otherwise at step 650, the first instruction is issued for each element of the vector. At a step 660, a mask is stored for the second instruction. At step 670, the second instruction is issued for each element of the vector. At a step 680, the first instruction completes. Accordingly, the second instruction is issued before the first instruction completes. Finally, at step 690, the second instruction completes and the process ends at step 640.

Figure 7:
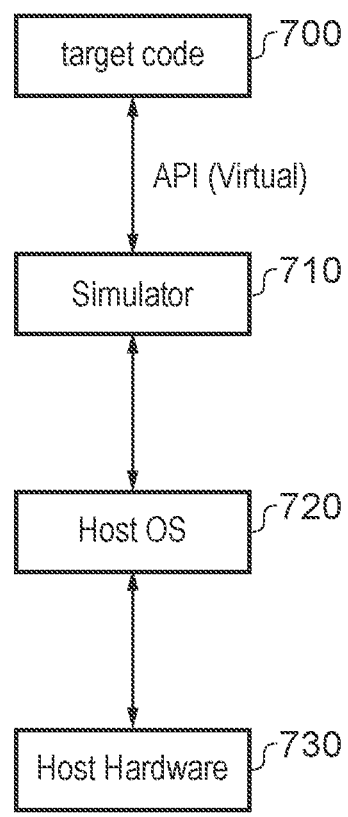
FIG. 7 illustrates a simulator implementation in accordance with some embodiments.

FIG. 7 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include the applications, operating systems and a hypervisor) which is the same as the application program interface of the hardware architecture being modelled by the simulator program 710. Thus, the program instructions of the target code 700, including the scheduling of vector instructions described above, may be executed from within the instruction execution environment using the simulator program 710, so that a host computer 730 which does not actually have the hardware features of the apparatus 300 discussed above can emulate these features.

It is therefore demonstrated that where instructions are mutually exclusive due to the use of vector predicate, it is possible to remove false data dependencies between those instructions and thereby issue both of the instructions before either of the instructions completes. In particular, for a given lane index, processing begins for the second instruction on that lane index prior to execution completing for the first instruction on the same lane index. The beginning of such processing could be the actual processing performed by the processing circuitry 140, but could also be a determination of whether processing is to take place on that lane (e.g. in the example shown in respect of FIG. 1A). By removing such data dependencies, it is possible to be more efficient in the issuing of instructions, which can thereby increase utilisation of the processing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus comprising:
a plurality of input lanes and a plurality of corresponding output lanes;
processing circuitry to execute a first vector instruction and a second vector instruction, wherein the processing circuitry is responsive to a vector predicate instruction to set a first mask that defines a first set of the output lanes that are valid for the first vector instruction;
mask circuitry to store the first mask, and to store a second mask that defines a second set of the output lanes that are valid for the second vector instruction, wherein the first set and the second set are mutually exclusive; and
issue circuitry to begin processing of the second vector instruction at a lane index prior to completion of the first vector instruction at the lane index;
analysis circuitry to perform analysis of the vector predicate instruction to determine and indicate that the issue circuitry can begin processing of the second vector instruction at the lane index prior to completion of the first vector instruction at the lane index when:
a predicate lane width of the output lanes specified in the vector predicate instruction is a first integer multiple of a first lane width of the output lanes specified in the first vector instruction, and
the predicate lane width is a second integer multiple of a second lane width of the output lanes specified in the second vector instruction.

2. The data processing apparatus according to claim 1, wherein
the second mask is an inversion of the first mask, or
the one of the first mask and the second mask is clear, or
the second mask is produced by inverting the first mask and clearing some or all of the output lanes, or
the first mask is produced by inverting the second mask and clearing some or all of the output lanes.

3. The data processing apparatus according to claim 1, wherein
the analysis circuitry is adapted to perform the analysis prior to the first mask and the second mask being generated.

4. The data processing apparatus according to claim 1, wherein at least one of the first integer multiple and the second integer multiple is 1.

5. The data processing apparatus according to claim 1, comprising:
vector predicate storage circuitry to store an indication that the vector predicate instruction is being applied, the predicate lane width, and an indication of where the first vector instruction and the second vector instruction are located.

6. The data processing apparatus according to claim 1, wherein
the vector predicate instruction specifies a condition and an indication of a set of test values, and the first mask is set based on those of the test values that meet the condition.

7. The data processing apparatus according to claim 1, wherein
the first vector instruction and the second vector instruction follow the vector predicate instruction in a stream of instructions.

8. The data processing apparatus according to claim 1, comprising:
dependency removal circuitry to remove one dependency of one or more dependencies between the first vector instruction and the second vector instruction, wherein the one dependency relates to data values, wherein
the issue circuitry is to issue the first vector instruction and the second vector instruction based on the one or more dependencies.

9. The data processing apparatus according to claim 1, comprising:
dependency generation circuitry to signal existence of one or more data dependencies between instructions including the first vector instruction and the second vector instruction, wherein the dependency generation circuitry is adapted to inhibit signalling of at least one of the one or more data dependencies.

10. The data processing apparatus according to claim 9, comprising:
instruction generation circuitry to generate the instructions from one or more source instructions and to detect that the first set and the second set are mutually exclusive by analysis of either the instructions or the source instructions.

11. The data processing apparatus according to claim 1, wherein
the mask circuitry causes the processing circuitry to inhibit execution on input lanes where the corresponding output lanes are indicated as being invalid.

12. The data processing apparatus according to claim 1, wherein
the mask circuitry causes outputs from the processing circuitry into the corresponding output lanes that are indicated as being invalid to be disregarded.

13. The data processing apparatus according to claim 1, wherein the first vector instruction and the second vector instruction take a same input parameter.

14. A method of data processing comprising:
executing a first vector instruction and a second vector instruction;
responding to a vector predicate instruction to set a first mask that defines a first set of output lanes that are valid for the first vector instruction;
storing the first mask;
storing a second mask that defines a second set of output lanes that are valid for the second vector instruction, wherein the first set and the second set are mutually exclusive;
performing analysis of the vector predicate instruction to determine and indicate that issue circuitry can begin processing of the second vector instruction at a lane index prior to completion of the first vector instruction at the lane index, wherein the analysis determines that:
a predicate lane width for each output lane of the first set of output lanes specified in the vector predicate instruction is a first integer multiple of a first lane width of the output lanes specified in the first vector instruction, and
the predicate lane width is a second integer multiple of a second lane width of the output lanes specified in the second vector instruction; and
beginning, by the issue circuitry, processing of the second vector instruction at the lane index prior to completion of the first vector instuction at the lane index.

15. A non-transitory storage medium storing a computer program for controlling a host data processing apparatus to provide an instruction execution environment comprising:
a plurality of input lane data structures and a plurality of corresponding output lane data structures;
processing programming logic to execute a first vector instruction and a second vector instruction in the instruction execution environment and to respond to a vector predicate instruction to set a first mask that defines a first set of the output lane data structures that are valid for the first vector instruction;
a mask data structure to store the first mask, and to store a second mask that defines a second set of the output lane data structures that are valid for the second vector instruction, wherein the first set and the second set are mutually exclusive; and
issue programming logic to begin processing, in the instruction execution environment, of the second vector instruction at a lane index prior to completion of the first vector instruction at the lane index;
analysis programming logic to perform analysis of the vector predicate instruction to determine and indicate that the issue programming logic can begin processing of the second vector instruction at the lane index prior to completion of the first vector instruction at the lane index when:
a predicate lane width of the output lane data structures specified in the vector predicate instruction is a first integer multiple of a first lane width of the output lane data structures specified in the first vector instruction, and
the predicate lane width is a second integer multiple of a second lane width of the output lane data structures specified in the second vector instruction.

* * * * *